United States Patent [19]

Dahlquist et al.

[11] Patent Number: 4,740,312
[45] Date of Patent: Apr. 26, 1988

[54] METHOD OF REGENERATING A SEPARATION MEANS FOR A LIQUID MEDIUM CONTAINING UNDISSOLVED CONSTITUENTS

[75] Inventors: Erik Dahlquist; Sune Flink, both of Västerås; Sören Stridsberg, Karlstad; Milan Teppler; Bertil Åkerblom, both of Västerås, all of Sweden

[73] Assignee: AB Asea-Atom, Västerås, Sweden

[21] Appl. No.: 4,045

[22] Filed: Jan. 16, 1987

[30] Foreign Application Priority Data

Jan. 20, 1986 [SE] Sweden ................................. 8600229

[51] Int. Cl.$^4$ ............................................. B01D 13/00
[52] U.S. Cl. ..................................... 210/636; 210/639; 210/321.63
[58] Field of Search ............... 210/193, 334, 648, 639, 210/321.1, 433.2, 636, 321.63

[56] References Cited

U.S. PATENT DOCUMENTS 3,857,786 12/1974 Wolf ................................. 210/334 X
4,066,546 1/1978 Sasaki ................................. 210/193 X
4,077,885 3/1978 van Heuven et al. ............... 210/193

FOREIGN PATENT DOCUMENTS 0013168 2/1977 Japan ................................. 210/334

Primary Examiner—Frank Spear
Attorney, Agent, or Firm—Watson, Cole, Grindle & Watson

[57] ABSTRACT

A separation means for a liquid medium containing undissolved constituents comprises a chamber (10) with dynamic membrane (11, 12) arranged therein, said membrane consisting of a porous support matrix (11a, 12a) or other support matrix with through holes, and a layer (11b, 12b) of a small-sized particle material generated thereon in the chamber. In such a separation means the flow of the liquid medium is split into two streams, one constituting the permeate stream which penetrates through the membrane and the other constituting the reject stream which flows past the membrane. To regenerate the membrane, the deposit of said undissolved constituents formed on the membrane during use of the separation means is removed from the support matrix, with the aid of one or more movable devices (21b, 22, 23) brought into mechanical contact with the layer of particle material and moved along the support matrix by a rotor (21) arranged in the chamber, while at least a portion of the particle material is allowed to remain on the support matrix.

11 Claims, 1 Drawing Sheet

METHOD OF REGENERATING A SEPARATION MEANS FOR A LIQUID MEDIUM CONTAINING UNDISSOLVED CONSTITUENTS

BACKGROUND OF THE INVENTION

The present invention relates to a method of regenerating a dynamic membrane in a separation means for a liquid medium containing undissolved constituents, the separation means comprising a chamber with a dynamic membrane arranged therein, the dynamic membrane consisting of a layer of small-sized particle material generated on a support matrix with through holes, such as a porous support matrix in the chamber. In such a separation means a liquid medium supplied to the pressurized chamber flows past the dynamic membrane and is split into two streams, one constituting the permeate stream which penetrates through the membrane and the other constituting the reject stream which flows past the dynamic membrane. The layer of small-sized particle material is porous and has finer pores than the holes or pores in the support matrix.

During use of the separation means a layer of undissolved constituents in the liquid medium which is deposited on the membrane gradually increases in thickness, thereby gradually reducing the permeate stream. After some time in operation, therefore, the deposit must be removed and the layer of the small-sized partricle material must be renewed or its original properties restored in some other way. This regeneration of the membrane should be performed without dismantling the separation means. Hitherto this has been effected by back flushing with liquid or compressed air, or by dissolving or washing away the deposit and the particle material and thereafter supplying a slurry of new particle material to the chamber under such conditions that a layer of the particle material is deposited on the support matrix, including in its through holes or pores.

SUMMARY OF THE INVENTION

According to the present invention it has proved possible to effect regeneration of the dynamic membrane while still in the separation chamber in a considerably simpler manner and one which gives superior reproducibility than previous methods. According to the invention this is achieved by the deposit of undissolved constituents in the liquid medium formed on the dynamic membrane during use of the separation means is removed from the support matrix with the aid of one or more movable devices brought into mechanical contact with the layer of particle material, and moved along and past the support matrix by a rotor arranged in the chamber, while at least a portion of the particle material is allowed to remain on the support matrix.

One feasible explanation of the excellent results obtained according to the invention is that the material is removed from the support matrix in such a manner that the pore structure of the dynamic membrane remains essentially intact. Particle material present in the pores or through holes of this support matrix or their entrances will remain in place during the treatment. With previous regeneration methods it has been impossible to avoid altering the pore structure of the dynamic membrane. Back flushing causes local clogging of pores and uncontrolled movement of particles in other pores and entrances to other pores in the support matrix. If the membrane is washed, the deposit may prevent sufficient contact between wash fluid and particle material and the treatment may cause both chemical and physical alteration of the particle layer. Chemical alterations are even more prevalent if the deposit is removed by dissolving.

A support matrix of porous type may consist in conventional manner of a polymer material such as polyamide, polypropene, cellulose acetate and polysulphone, in the form of a semi-permeable, porous film, or of a thin porous sheet of metal such as stainless steel of a nickel alloy, or of a thin porous sheet of ceramic material such as aluminium oxide. The support matrix may also consist of a woven or felted product with through holes, composed of fibres of a polymer material such as those exemplified above, or of polyethylene glycol terephthalate or polytetrafluoroethylene, or fibres of a metallic material such as stainless steel or of a natural fibre such as cotton. The pore size in a porous support matrix is preferably 0.01–10 $\mu$m, and the holes in a woven or felted support matrix are preferably sized 0.5–20 $\mu$m. The thickness of the support matrix is preferably 0.1–10 mm.

The small-sized particle material may in conventional manner consist of an inorganic oxide such as silica, titanium dioxide or magnetite, of glass or of a polymer material such as polystyrene. The particles in the layer applied are preferably of a size of 0.001–10 $\mu$m. They are applied from a slurry supplied on the support matrix in the separation chamber, a pressure difference being maintained between the chamber and the permeate side of the membrane during application. The pore size in the layer of particle material formed on the support matrix is preferably 0.001–0.5 $\mu$m and the thickness of the layer is preferably 0.01 $\mu$m –0.2 mm. In some cases it may be suitable for the particle layer to be formed of two or more layers. In this case, the particles in the layer nearest the support should be larger than in the layer(s) further away from the support.

During removal of the deposit to regenerate the dynamic membrane, a pressure difference of 0.03–0.4 MPa is preferably maintained over the dynamic membrane.

If particle material is removed simultaneously with the deposit to such an extent as to essentially alter the function of the membrane, fresh particle material should be applied on the support matrix.

According to one embodiment of the invention the devices moved by the rotor for removal of deposits collected on the dynamic membrance, consist of scrapers fitted on the rotor. These may be movably secured to the rotor and arranged to be brought into mechanical contact with the layer of particle material in only one direction of rotation of the rotor, contact with the layer being prevented in the other direction of rotation.

According to another embodiment of the invention the shaft of the rotor is perpendicular to the active surface of the dynamic membrane and the movable devices are brought into contact with the layer of particle material by the rotor being displaced relatively to the surface in the longitudinal direction of the shaft.

In the embodiments described above the movable devices may comprise brushes, felt, pads, blades or shutters arranged on the rotor and consisting of a material which will not cause any damage to the matrix, preferably a material softer than the material in the support matrix.

The material may be removed from the support matrix in a separate step between separation phases or during a separation phase. In the latter case the rotor is rotated continuously or intermittently while separation of undissolved constituents from the liquid is in progress.

The invention will now be explained in more detail by the description of examples with reference to the accompanying drawings.

DETAILED DESCRIPTION OF THE PREFERRED EMBODIMENTS

Figure 1:
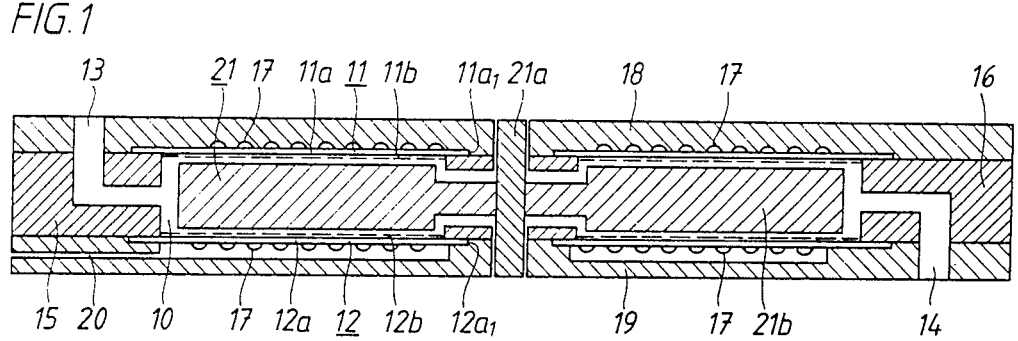
FIG. 1 shows a separation means according to the present invention in a section through the rotor shaft perpendicular to the dynamic membrane, FIG. 2 a dynamic membrane and the rotor seen from inside the separation means in the direction of the rotor shaft.
Figure 2:
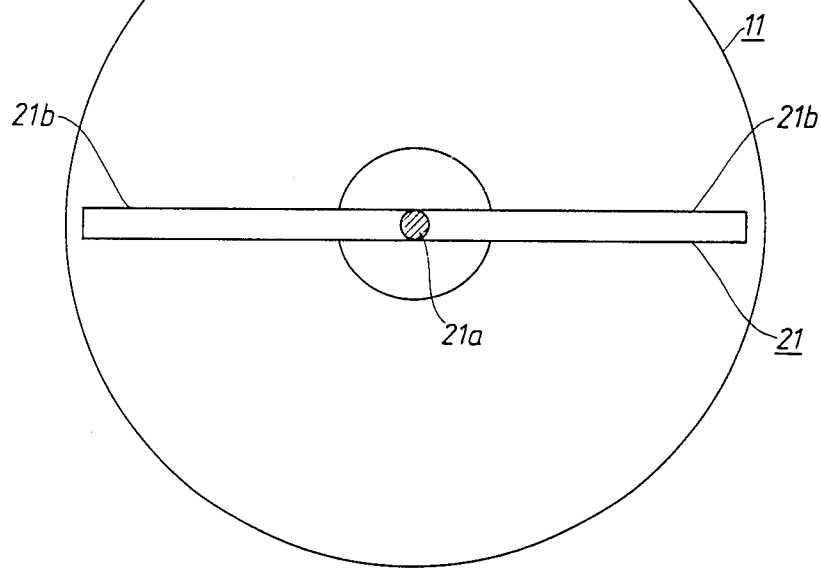

The separation means according to FIGS. 1 and 2 comprises a chamber 10, cylindrical in shape and having two circular dynamic membranes 11 and 12, one at each end surface of the chamber. The edges of the membranes are sealed to the chamber walls (seals not shown). Each dynamic membrane consists of a porous support matrix 11$a$ and 12$a$, respectively, consisting of polyamide film with a central circular aperture 11$a_1$, 12$a_1$, and of a layer 11$b$, 12$b$, respectively, of a small-sized particle material in the form of silica having a particle size of 0.01 $\mu$m. The pore size in the material of the support matrix is about 1 $\mu$m, and in the material in layers 11$b$ and 12$b$ about 0.05 $\mu$m. Each polyamide film 11$a$, 12$a$, is 0.2 mm in thickness and each layer 11$b$, 12$b$, 20 $\mu$m. At one point on the envelope surface the chamber is provided with an inlet 13 for liquid medium to be treated in the separation means, and an outlet 14 is provided in the envelope surface diametrically opposite the inlet, for removal of the portion of the liquid medium, the reject, flowing past the dynamic filter. The inlet 13 and outlet 14 are arranged in the side walls 15 and 16 of the chamber. The portion of liquid passing through the dynamic membrane, the permeate, enters channels 17 arranged in the end walls 18 and 19 of the chamber. The channels 17 communicate with an outlet 20 for the permeate. Layers 11$b$ and 12$b$ are generated in the chamber by an aqueous suspension of silica having a silica concentration of 200 ppm being conducted into the chamber under gradually increasing pressure until the pressure difference over the dynamic membranes is 0.1 MPa.

A rotor 21 is arranged in the chamber 10, in the example shown with a shaft 21$a$, its centre line coinciding with the symmetry axis of the cylindrical chamber, and two vanes or blades 21$b$. The rotor shaft is sealingly journalled in the walls of the chamber (seals not shown).

When the separation means is functioning, the liquid medium with undissolved constituents is introduced continuously through inlet 13 to chamber 10 of the separation means. The liquid may consist of water containing drops of oil and solid particles, such as oily water from oil refineries and oil platforms or waste water from workshops performing machining by detachment of cuttings. Most of the water passes through the dynamic membranes 11 and 12 as a permeate stream and can usually be conducted via outlet 20 to a recipient. The remainder, the reject stream, is removed via outlet 14 and is returned to the polluted starting material or is subjected to some other treatment, generally rather simple treatment. During the process described a pressure difference is maintained, preferably of 0.03–0.3 MPa between the medium on both sides of a dynamic membrane. The undissolved constituents gradually accumulated on the dynamic membranes are removed by the rotor 21 when the deposit of undissolved constituents offers such resistance to the permeate stream that the separation can no longer be performed with commercially satisfactory results.

Figure 3:
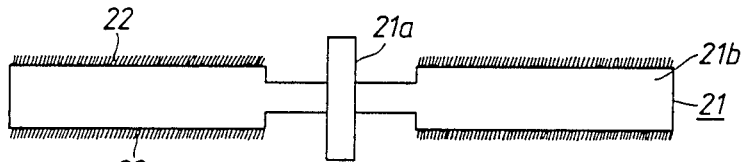
FIGS. 3 and 4 show different embodiments of the rotor in the same section as in FIG. 1.

As is clear from the above, regeneration of the dynamic membrane is effected by the movable devices on the rotor being brought into contact with the layer of particle material, and moved along the support matrix. In the case shown in FIG. 3 the rotor 21 is provided with brushes 22 arranged on the vanes 21$b$, or mats of textile material such as polythene or polypropene fibres or some other polymer or cotton fibre which will remove the deposits when the rotor is turned slowly, preferably while simultaneously supplying water or the aqueous medium being treated at inlet 13 and removing the liquid at outlet 14.

Figure 4:
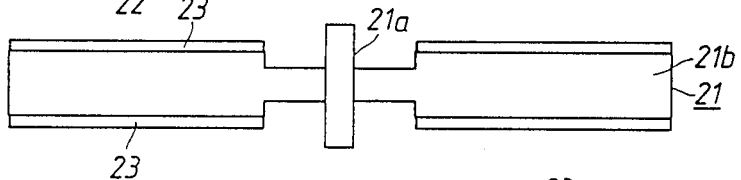
Figure 5:
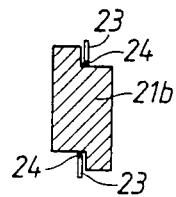
FIG. 5 shows an embodiment of the rotor in a section perpendicular thereto.

According to FIGS. 4 and 5 scrapers 23 may be used instead of brushes, in the form of blades or shutters of a material such as polypropene or some other polymer, which will not damage the membrane. These are secured by joints 24 to the rotor vanes 21$b$ so that they are in operative position when the rotor turns in one direction but are inoperative when it turns in the other direction. The scrapers can thus be turned down during cleaning and turned up during regeneration.

Yet another method of effecting contact between the dynamic membranes and active parts of the rotor is to utilize the rotor vanes 21$b$ as scrapers. In this case they should be made of a material which will not damage the dynamic membranes, and be arranged movable in relation to the membranes in a direction perpendicular to the membranes. This can be achieved either by making the rotor shaft 21$a$ with the rotor displaceable in a stationary chamber 10 or by making the chamber displaceable along a rotor which is stationary in longitudinal direction of its shaft.

In all the examples described above if required the silica particles are replenished as described above after removal of the deposits which generally causes a part of layers 11$b$ and 12$b$ to be removed at the same time.

In the examples described it is assumed that regeneration of the dynamic filters is performed as a separate process between separation phases. However, it is also possible, using the equipment and material exemplified, to perform the regeneration intermittently or continuously during the separation process, i.e. without the process being interrupted. In this case the rotor is turned intermittently or continuously during the separation process, bringing the exemplified movable devices on the rotor into contact with particle layers 11$b$, 12$b$ and moving the devices along the layers.

The drawings show a separation means with only one chamber. However, it is usually advisable to use a group of several such means stacked close together with the inlets 13 connected to a common main pipe, the outlets 14 connected to a common main pipe and the outlets 20 also connected to a common main pipe.

The invention is also suitable for use in separating various types of slurries such as coal-water slurry, peatwater slurry and waste water from the production of cellulose.

We claim:

1. A method of regenerating a dynamic membrane in a separation means for a liquid medium containing undissolved constituents, said separation means comprising a chamber having a dynamic membrane arranged therein, said dynamic membrane consisting of a layer of a small-sized particle material generated on a support matrix with through holes, a liquid medium being supplied to the separation means and conveyed past the dynamic membrane so as to be split into two streams, one stream constituting the permeate stream which penetrates through the dynamic membrane and the other stream constituting the reject stream which flows past the dynamic membrane, a deposit of undissolved constituents concurrently forming on the layer of particle material of said dynamic membrane, said method including the steps of positioning a rotor having a movable device thereon within said chamber such that said movable device can contact said deposit of undissolved constituents on the layer of particle material of said dynamic membrane when said rotor is rotated in only one direction of rotation, and rotating said rotor in said one direction of rotation such that said movable device contacts said deposit of undissolved constituents to remove said deposit of undissolved constituents and a portion of said layer of particle material of said dynamic membrane.

2. A method according to claim 1, including the step of applying fresh particle material to said support matrix.

3. A method according to claims 1 or 2, wherein said movable device consists of a scraper attached to the rotor.

4. A method according to claim 1, wherein said movable device comprises a brush or a felt pad arranged on the rotor and consists of a material softer than the particle material in the support matrix.

5. A method according to claim 1, wherein said movable device comprises a blade or a shutter.

6. A method according to claim 1, wherein said movable device is intermittently moved over said dynamic membrane.

7. A separation apparatus for separating undissolved constituents from a liquid medium containing undissolved constituents, said separation apparatus comprising housing means which provides a chamber therein and which includes an inlet for liquid containing undissolved constituents, an outlet for a permeate stream and an outlet for a reject stream, a dynamic membrane positioned within said chamber, said dynamic membrane comprising a support matrix and a layer of particle material on said support matrix, said layer of particle material being exposed to said liquid containing undissolved constituents supplied to said chamber via said inlet, and a rotatable rotor located in said chamber, said rotor including a movable device thereon which can contact a deposit of undissolved constituents formed on said layer of particle material of said dynamic membrane only when the rotor is rotated in one direction of rotation so as to remove said deposit of undissolved constituents and a portion of the layer of particle material of said dynamic membrane.

8. A separation apparatus according to claim 7, wherein said movable device comprises a brush.

9. A separation apparatus according to claim 7, wherein said movable device comprises a blade.

10. A separation apparatus according to claim 7, wherein said movable device comprises a shutter.

11. A separation apparatus according to claim 7, wherein said support matrix has a thickness of about 0.1 to 10 mm and said layer of particle material has a thickness of about 0.01 $\mu$m to 0.2 mm.

* * * * *